May 29, 1956  L. THORINGTON  2,748,303
COLOR-CORRECTED LIGHT SOURCE AND PHOSPHORS THEREFOR
Filed Nov. 10, 1949  3 Sheets-Sheet 1
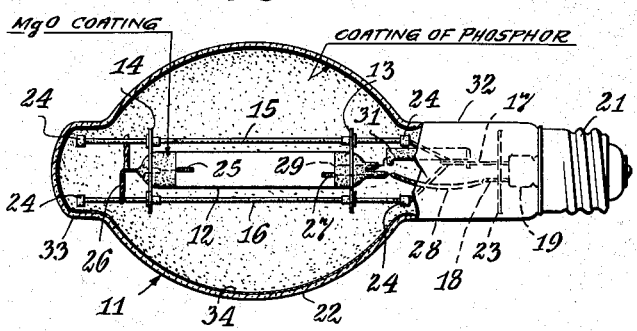
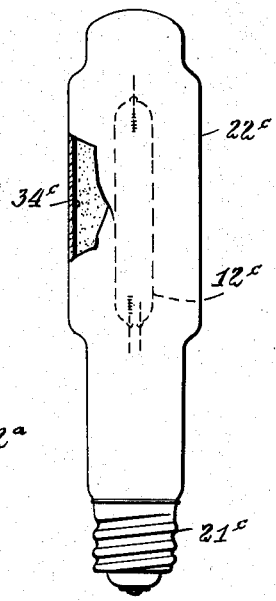
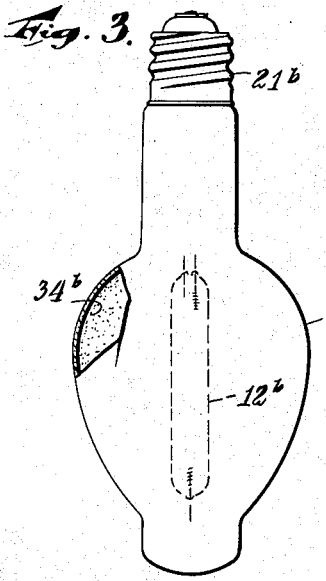
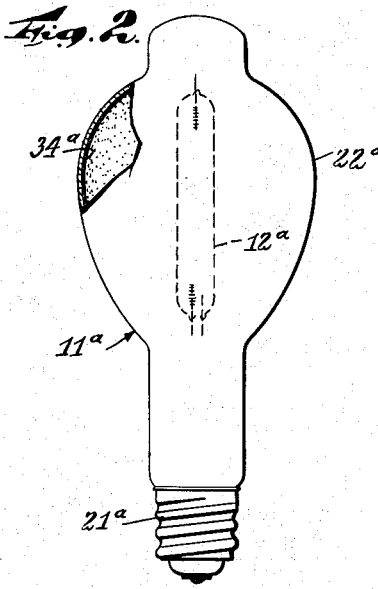
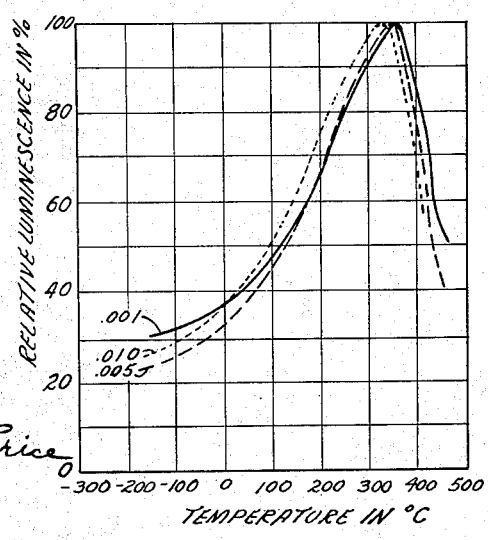
INVENTOR
LUKE THORINGTON.

May 29, 1956　　　　　　L. THORINGTON　　　　　2,748,303
COLOR-CORRECTED LIGHT SOURCE AND PHOSPHORS THEREFOR
Filed Nov. 10, 1949　　　　　　　　　　　　3 Sheets-Sheet 2
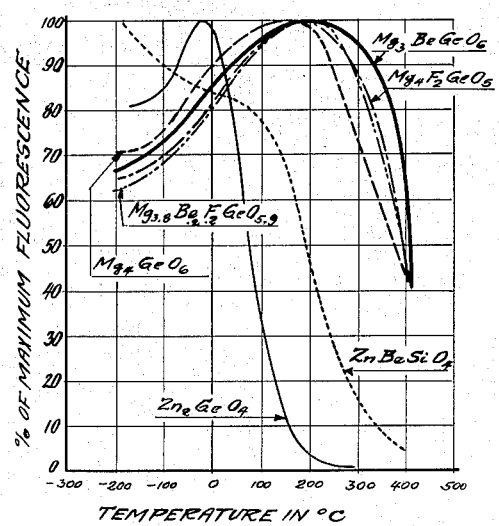
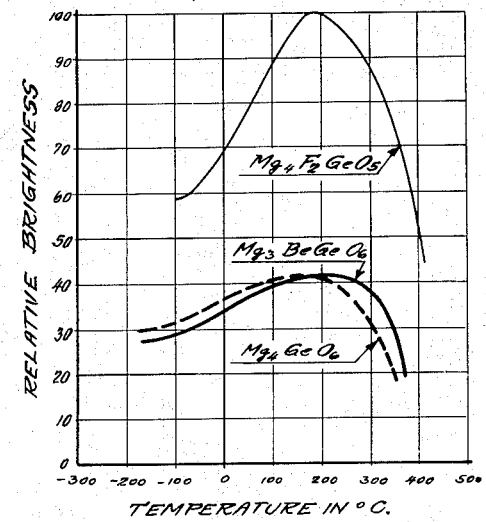
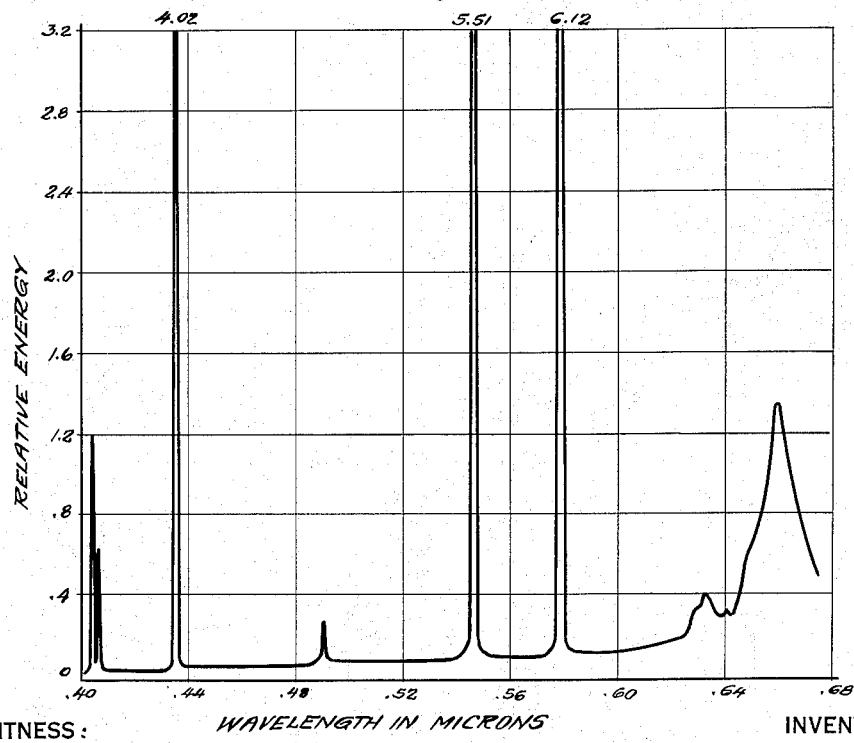
WITNESS:　　　　　　　　　　　　　　　　INVENTOR
　　　　　　　　　　　　　　　　　　　LUKE THORINGTON.
Towson Price　　　　　　　　　　　　　BY
United States Patent Office 2,748,303
Patented May 29, 1956

2,748,303

COLOR-CORRECTED LIGHT SOURCE AND PHOSPHORS THEREFOR

Luke Thorington, Bloomfield, N. J., assignor to Westinghouse Electric Corporation, East Pittsburgh, Pa., a corporation of Pennsylvania Application November 10, 1949, Serial No. 126,506

11 Claims. (Cl. 313—25)

This application is a continuation-in-part of my application Serial No. 55,672, filed October 21, 1948, now abandoned.

This invention relates to the color modification of light sources, especially mercury vapor devices, and to the phosphors used in effecting this modification.

The principal object of my invention, generally considered, is to produce a high pressure mercury vapor (H. P. M. V.) or other discharge lamp, or other light source emitting ultra-violet rays, having combined therewith luminescent material for generating rays to supplement or correct or both, the radiations generated by said source.

An object of my invention is to provide in combination with a H. P. M. V. lamp or other source of visible and ultra-violet radiations, an envelope surrounding said source, and a coating on the inner surface of said surrounding envelope of a phosphor capable of adding red light to the radiations emitted by said source.

Another object of my invention is to provide a new high intensity discharge lamp in which a major portion of the light generated consists of the efficient mercury visible spectrum produced by a higher pressure than is used in present fluorescent lamps, an envelope surrounding said lamp, and a coating on the inner surface of said surrounding envelope of a phosphor capable of adding red light to the radiations emitted by said lamp.

A further object of my invention is to modify a manganese-activated magnesium germanate phosphor by substituting fluorine for some of the oxygen in the magnesium oxide in order to form a new phosphor or phosphors and get better luminescence efficiency at elevated temperatures.

An additional object of my invention is to provide a color-corrected light source, as above described, with an outer bulb so shaped as to have approximately uniform temperature on its surface, and be of the correct size to hold the employed phosphor at a proper temperature for efficient luminescence.

Another object of my invention is to provide, in a lamp color-corrected by an outer envelope coated with a red luminescing phosphor, a coating of a highly reflecting material, such as magnesium oxide, on the ends of the lamp, metal supports, or other parts of the inner structure which may absorb radiation incident upon it.

Other objects and advantages of the invention will become apparent as the description proceeds.

Referring to the scale drawings:

Figure 1 is a side elevational view, with parts in axial section, of a lamp embodying my invention.

Figures 2, 3, and 4 are views corresponding to Figure 1, but showing other embodiments of my invention.

Figure 5 is a graph showing how the luminescence of various phosphors varies with the temperatures at which they are operated.

Figure 6 is a graph similar to Figure 5, but with the ordinates adjusted to relative brightnesses of the phosphors.

Figure 7 is a graph showing in terms of relative energy, as distinguished from visibility, a typical or approximate spectral distribution curve for one of my color-corrected lamps.

Figure 12 is a graph comparing the temperature dependence of magnesium fluorogermanate phosphors with different manganese concentrations.

Figure 8:
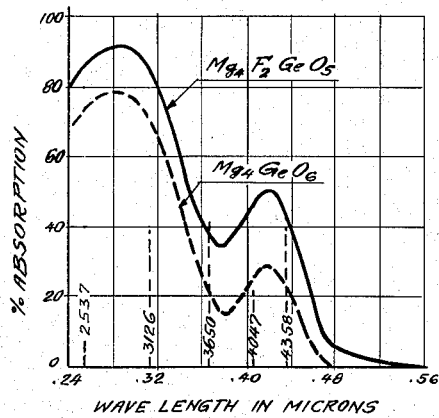
Figure 8 is a graph comparing the absorption and excitation spectra of magnesium fluorogermanate and magnesium germanate phosphors.

Lamps of one type, to which the present invention relates, have already found limited commercial application in this country and abroad, chiefly because of their high efficiency and long life. Such lamps, however, are not applicable where color discrimination involving the red visual range is of importance, since the emitted radiation is sorely deficient in this range.

Previously, various means have been employed to improve the quality of the light from high pressure mercury vapor (H. P. M. V.) lamps, involved in the embodiment of my invention illustrated in Figures 1 to 4, inclusive, but to my knowledge none have proved of significant commercial value and all result in large losses in lumen efficiency for small improvement in light quality. For example, incandescent sources are commonly used in combination with H. P. M. V. lamps for improved color. A combination such that the color improvement is just perceptible has an efficiency of approximately 37 lumens per watt (L. P. W.) with about 3% of total lumens in the red spectral region. Maximum recommended color correction with incandescent sources is attained when 40% Hg lumens and 60% incandescent lumens are used in combination. Efficiency of such a combination is about 25 L. P. W., with about 12% of total lumens in the red.

Another method of color-correcting H. P. M. V. lamps, is to utilize the normally-wasted ultra-violet radiation from the arc in quartz to excite a phosphor in an attempt to obtain emission in the desired spectral range. This method invited particular consideration, since about ⅓ of the total radiation emitted below 26,000 A. U. by H. P. M. V. lamp (e. g. the type H–1 in quartz; see article by E. W. Beggs, beginning page 430, volume 42, No. 4, Trans. I. E. S., 1947) lies in the ultra-violet and is thus available for phosphor excitation.

The stringent requirements imposed upon a phosphor for use in the color correction of the light given by high temperature sources of ultra-violet radiations deficient in red light, such as H. P. M. V. quartz lamps, have heretofore served to eliminate all commonly known luminescent materials. Thus, there have as yet been no really practical color-corected lamps of this type using phosphors. The desirable properties of a phosphor for such application may be set down as follows:

1. It should be excited by both the long and short ultra-violet rays of the mercury spectrum.

2. The luminescent light emitted should be in the spectral range between 6000 A. U. and 7000 A. U.

3. It should have high luminescence efficiency at elevated temperatures.

4. It should be as near white as possible.

I have discovered that a phosphor possessing all of these properties to a certain degree is magnesium germanate activated by manganese and having a magnesium/germanium ratio of approximately 4/1. A typical composition may be $4MgO \cdot GeO_2 : .01Mn$. Such a phosphor is described in the Williams Patent No. 2,447,448, dated August 17, 1948, which gives the lower limit of the preferred magnesium/germanium ratio as 3/1. My experience with such a phosphor prepared as specifically described in said patent, is that it is very light yellow in color and excited by all ultra-violet mercury lines to a bright and pure red luminescence. I have also found that its optimum luminescence occurs at a temperature lower than that present in a H. P. M. V. lamp, though it is much superior in this respect to most common phosphors, as illustrated in Figure 5.

The outer bulbs of the standard type H. P. M. V. lamps (i. e. H–4, H–5, H–1, and H–12 lamps, see Beggs' article previously referred to) operate at a temperature near 400° C. It is therefore, obvious that a larger bulb is necessary to match its temperature with that of peak efficiency of the phosphor, thereby producing the most efficient lamp embodying this phosphor. I have found it possible to considerably improve the temperature independence and increase the brightness of such a phosphor by the substitution of other material for some of the oxygen in the magnesium oxide or magnesium in the magnesium oxide, or both.

A typical composition, in molar proportions, for a phosphor incorporating such a substitution, is as follows:

3.5 MgO
.5 BeO
1.0 $GeO_2$
.01 Mn

Such a phosphor was used to make a color-corrected lamp from which the graph of Figure 7 was determined. This graph shows how the red light generated in the range between .62 and .68 micron, supplements the mercury lines between .40 and .58 micron so as to provide what appears to be white light. By a comparison of the curves illustrated in Figure 5, it will be seen that it has much better efficiency at elevated temperatures than a plain germanate phosphor. A sample of the composition $2MgO.2BeO.GeO_2:.01Mn$ appeared perfectly white and was practically unactivated by the mercury ultraviolet, while an attempt to make beryllium germanate resulted in a discolored, totally non-fluorescent, product. Room temperature luminescence of the successful beryllium-substituted samples was about the same as that of the unsubstituted phosphor.

As also evident from Figure 5, additional or alternative small substitutions of fluorine for oxygen have an effect on temperature stability apparently similar to that of beryllia alone, and this is in addition to its beneficial action as a flux in the preparation of the phosphor. This use of fluorine is of special value in view of the reported toxicity of beryllium compounds. From .1 to 2 moles of fluorine have been substituted with beneficial effects. A change in nomenclature, since the filing of the parent application has been made for these phosphors, i. e., the prefix "fluo" has been changed to "fluoro" for all the fluorine-substituted germanates. "Fluogermanate" implies a salt of fluogermanic acid, whereas fluorogermanate simply implies the presence of fluorine without regard to proportion or structure; at present it seems unlikely that the phosphor could be a fluogermanate and it is thus felt safer to use the more general term.

Best results were first obtained by substitution of fluorine for oxygen, using $MgF_2$ made in the laboratory from MgO and HF, to produce a phosphor having the formula, $2MgO \cdot 2MgF_2 \cdot GeO_2 : .01Mn$, which has a room temperature brightness approximately twice that of a batch of the unsubstituted magnesium germanate. Later, however, upon receipt of a pure $MgF_2$ the best molar ratio of $MgO/MgF_2$ was found to be around 3/1, or as shown by the later-determined formula;

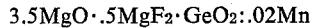

$3.5MgO \cdot .5MgF_2 \cdot GeO_2 : .02Mn$

The fluorine content may be varied continuously up to about a mole ratio between magnesium oxide and magnesium fluoride of 1 to 1, with the magnesium oxide varying between and including 6 and 2 moles. Activator concentration may vary between and including .001 and .1, as in the other compounds. Thus the manganese-activated magnesium fluorogermanate phosphor of this invention has the gram molecular formula

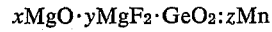

$xMgO \cdot yMgF_2 \cdot GeO_2 : zMn$ in which $x$ is a number lying in the range between and including 2 and 6, $y$ is a number lying in the range between and including 2 and .1, and $z$ is a number lying in the range between and including .001 and .1.

PREPARATION OF MAGNESIUM FLUOROGERMANATE:Mn

The method of phosphor preparation used by me differs considerably from that used by Williams, as the use of oxides and dry mixing was felt to be much simpler and more rapid, and the final results even better.

The pure MgO used in the factory of the assignee for the preparation of magnesium tungstate has been found quite suitable as a raw material in making the phosphor. Good results have been obtained with both the technical and purified grades of $MgF_2$ manufactured by General Chemical Corporation; results thus far (none of which were aimed at a comparison of the grades) do not favor one grade above the other. Germanium dioxide has been obtained in very pure form from the Eagle Picher Company at a cost of 15¢ per gram. Manganese is added as manganous carbonate of reagent grade. All raw materials were sieved through 100 mesh silk bolting cloth before using.

Molar proportions of the phosphor and the corresponding weights used for a typical batch are as given later. The raw materials are weighed, placed in a ½ gal. ball-mill about half filled with pebbles, and milled for approximately one hour. After this milling the batch is usually packed to some degree but is fairly well mixed. After sieving through 100 mesh bolting cloth the material is placed in a platinum tray and fired in an air atmosphere at 1100° C. for one hour. (There are indications that an oxygen atmosphere improves slightly the luminescence of the final product.) The batch is then ball-milled again for one hour, sieved, and returned to the furnace at 1100° C. and fired overnight—approximately 16 hours. After this firing the phosphor appears a light yellow color but fluoresces a bright red under both 2537 A. U. and 3650 A. U. excitation. Further milling may be employed to thoroughly break up the batch but should not last longer than ½–1 hour in order not to materially reduce the apparent luminescence efficiency.

Hammer milling may, however, prove superior to ball-milling the raw batch, or a wet method of mixing may prove superior to both. Firing temperature and time are probably not optimum as given, since they have been studied but little. Composition will be found only in the neighborhood of optimum with respect to $MgO/MgF_2$ ratio.

This phosphor is light yellow in physical color. This is not surprising since most phosphors which are efficiently activated by 3650 A. U. radiation are colored. The explanation is apparent when it is realized how broad the absorption and emission bands of most solids are. If a phosphor is to have maximum absorption at 3650 A. U. it is quite likely that the absorption band will continue into the visible range, resulting in a colored phosphor, most likely yellowish.

I have found that the 4358 A. U. line of the quartz H–1 lamp produces almost as much red fluorescence in a completed lamp as does the powerful 3650 A. U. line.

In Fig. 8 are plotted the absorption spectra of a fluorogermanate phosphor and a plain germanate phosphor from 2400 A. U. to 5600 A. U. The data were obtained from reflectivity measurements made with a hydrogen source for the ultraviolet below 3200 A. U. and with a tungsten source above 3200 A. U. The lines drawn in at the various mercury ultraviolet wave-lengths represent the relative amount of red luminescence excited by the respective mercury lines. It will be noted that one effect of adding fluoride is to intensify the absorption band of the phosphor; the effect appears to be more pronounced for the short wavelength peak than for the peak in the visible. Both curves are relative to a factory MgO which may not be as white as supposed.

Figure 9:
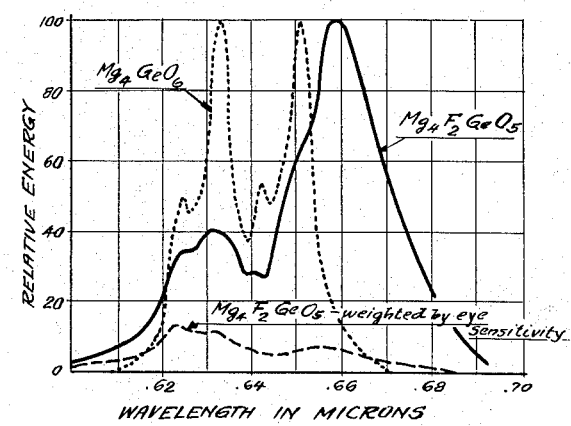
Figure 9 is a graph comparing the emission spectra of magnesium fluorogermanate and magnesium germanate phosphors.

The fluorescence spectrum is the most unique property of this phosphor aside from the unusual nature of its temperature dependence of luminescence. A comparison of the spectrum of magnesium germanate phosphor with my fluorogermanate phosphor is shown as measured photographically. Both spectra are characterized by sharp peaks lying between 6100 and 6800 A. U. Apparently the addition of fluoride materially suppresses the shorter wavelength peaks. In Fig. 9 is plotted also the fluorescence distribution weighted by eye sensibility; the ratio of the two areas gives the value of the luminosity coefficient which in this instance amounts to .131. This is the figure by which one must multiply energy in watts to obtain luminous energy for this spectrum. One watt of energy distributed in the germanate spectrum (Fig. 9), would be equivalent to .131 luminous watt or $$.131 \times 650 = 85.0 \text{ lumens}$$

(650 L. P. W. = electrical equivalent of light.)

Instead of merely substituting fluorine instead of beryllium, I may substitute fluorine in addition to beryllium to provide a magnesium beryllium fluorogermanate. An example of such is represented by the formula,

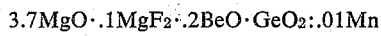

3.7MgO·.1MgF$_2$·.2BeO·GeO$_2$:.01Mn or expressed a different way,

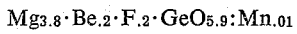

Mg$_{3.8}$·Be$_{.2}$·F$_{.2}$·GeO$_{5.9}$:Mn$_{.01}$

The magnesium oxide, beryllium oxide, fluorine, and manganese contents may have values in the ranges indicated for these materials in the beryllium-substituted and fluorine-substituted compounds.

Fluorine is added conveniently as MgF$_2$, in preparing the fluorine-substituted phosphors, in which other constituents are added as oxides or carbonates. Mixing is done wet or dry in a mortar with a pestle, or in a ball-mill, after which the batch is dried, ground, and sieved preparatory to firing. Long firings, 12 hours at temperatures between 1000° and 1250° C., have proven best for beryllium-substituted batches. Efficiency is improved by firing in an oxygen-steam atmosphere, as disclosed in the Nagy application, Serial No. 27,163, filed May 15, 1948, now abandoned. Fluorine-substituted batches have been found to require shorter firings, that is, from 1½ to 2 hours, in the same temperature range, but may be fired for the longer periods as above, sometimes to advantage.

Completed phosphors are coated on the inner surface of the outer bulb of the high-pressure mercury vapor lamp as nitrocellulose suspensions. The bulb is baked out at approximately 500° C. in a stream of air or oxygen to remove the binder, a quartz high-pressure mercury vapor inner bulb sealed in, and the annular space exhausted. The lamp is baked out at approximately 500° C. on the pump and sealed off at pressures less than 1 micron of mercury. Increased efficiency from such a lamp is effected by coating the inner structure with a reflecting material, such as magnesium oxide, and by shaping the outer portion so that its operating temperature coincides with the peak in the phosphor temperature-dependence curve, indicated by Figure 5.

In a lamp of isotemperature design employing the fluorine-substituted phosphor, the zero hour efficiency was 58 L. P. W. with about 11.5% of total lumens in the red. An overall lumen gain of 1.7 L. P. W. was obtained due to the phosphor. This provides 28% of visible radiated energy in the form of red light. In other words, for a 400 watt quartz lamp (type EH–1), approximately 20 watts of energy have been added in the form of red light by the phosphor.

Maximum efficiency and color correction are not the sole factors in determining outer bulb size and shape. It may be more desirable to sacrifice somewhat on efficiency in order to incorporate the phosphor into lamps of known construction. Also there is the problem of phosphor maintenance which apparently is a function of operating temperature and possibly excitation radiation density and therefore of bulb size. The use to which the lamp is to be put will of course determine to some extent the bulb size; as, for example, street lighting may require the smallest size for use in refracting and focusing fixtures.

It may seem unwise, therefore, in the light of all these factors, to try to arrive at a compromise bulb design. Nevertheless it is suggested that such a design may not be altogether out of reason. For example, a lamp made with a spherical outer bulb, the diameter of which corresponds to the maximum dimension of the arc tube, has many points in its favor. A 400 watt lamp of this type had an initial efficiency of 55.7 L. P. W., 9.1% red lumens, and maintenance at 460 hrs. which is good or even slightly better than the standard EH–1. The geometry of the source, as far as its use in reflecting and focusing fixtures, would seem as satisfactory as for the clear lamp, the difference being that the new fixture would be symmetrical about the major dimension of the present ovular type—very similar to some designs now used for incandescent lamps. The manufacture of the spherical bulbs would be no more difficult than that of the present cylindrical design.

Figure 10:
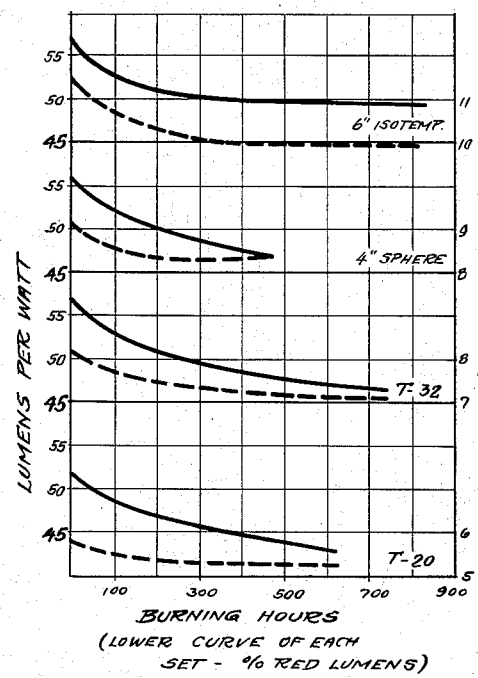
Figure 10 is a graph comparing the maintenance of different phosphor-coated lamps.

In Fig. 10 are plotted the maintenance curves for the standard coated EH–1 (lowest curve), a coated T–32 H–1, a coated 4" spherical H–1, and a coated bulb of near optimal design with H–1 inner (6" isotemp.). The change noted in the percentage red lumens is due partly to solarization of the quartz arc tube to the shorter mercury ultraviolet and partly, it is believed, to solarization of the phosphor itself. The effect of the solarization (or other lamp operating conditions) appears to be that of destroying some of the manganese-complex centers which are responsible for the absorption and emission properties of the phosphor and, therefore, decreasing the intensity of the absorption bands (or increasing the intensity of the reflection bands). Manganese so removed from its role of activator may be in the form of one of its colored oxides which will absorb more strongly in the visible and thus account for the observed effect.

On the basis of the preceding explanation, it would seem best to use as thin a phosphor coating as possible in order to improve lamp maintenance, and this is found to be the case. All the lamps whose maintenance curves are shown in Fig. 10 were fairly thinly coated, i. e., the outline of the inner structure could be easily seen through the coating. If any visual change in phosphor color should be noticeable during life of a coated lamp, it should be in the direction of darker yellow (i. e., yellow plus brown or black) rather than a more yellow color, if the above data have significance. It may be noted that at elevated temperatures the absorption band of the phosphor is broadened considerably as is also the fluorescence emission band. Thus the coating appears much yellower immediately after a lamp is turned off than when it is cool.

The information reported thus far which deals with the best color-corrected lamp we are capable of making, has been diffused over several pages. For convenience and easy reference there is set down all the pertinent information in the following table.

PHOSPHOR

Preparation and Composition

| Molar Composition | Raw Material |
| --- | --- |
| 3 MgO | MgO: Factory material used for tungstate. |
| 1 MgF$_2$ | MgF: General Chem. Co. Tech. or Purified. |
| 1 GeO$_2$ | GeO$_2$: Eagle Picher Co. |
| .01 Mn | MnCO$_3$: Bakers C. P. Analyzed (or equivalent). |
| Batch Mixing | Ballmill 1 hr. and sieve. |
| Firing | 1,100° C./1 hr; ballmill 1 hr.; 1,100° C./10-16 hrs.; air atmosphere. |
| Phosphor Milling | Less than 1 hr. |
| Coating Suspension | Nitrocellulose lacquer slurry somewhat thinner than for F lamps.[1] |

PROPERTIES

| | |
| --- | --- |
| Physical Color | Yellowish. |
| Crystal Structure | Magnesium ortho-germanate structure. |
| Excitation | Broad peak at 2,800 A. U.; lesser peak at 4,200 A. U. |
| Emission | Red, between 6,100 A. U. and 6,800 A. U. |
| Luminosity Coefficient of Spectrum. | About .131. |
| Temperature Dependence of Luminescence. | Peak at about 180° C. |

| Color Corrected H. P. M. V. Lamp | 400 W. | 1,000 W. |
| --- | --- | --- |
| Inner Bulb | Quartz H-1 | Quartz H-12. |
| Outer Bulb | 4″ spherical-172 glass. | 6″ spherical-172 glass. |
| Coating | Thin nitrocellulose suspension, on washed, prebaked (550° C./45 min.) Coating then removed from all but spherical surface. | |
| Inner Structure Coating | MgO coating on arc tube ends, metal and mica supports. | |
| Lumen Efficiency | 50 L. P. W. (100 hrs.) | 60 L. P. W. (100 hrs.) |
| Percent Red Lumens | 9.0% (100 hrs.) | 9.0% (100 hrs.) |
| Maintenance | As good as the standard uncoated lamps. | |

[1] Ordinary fluorescent lamps.

Figure 11:
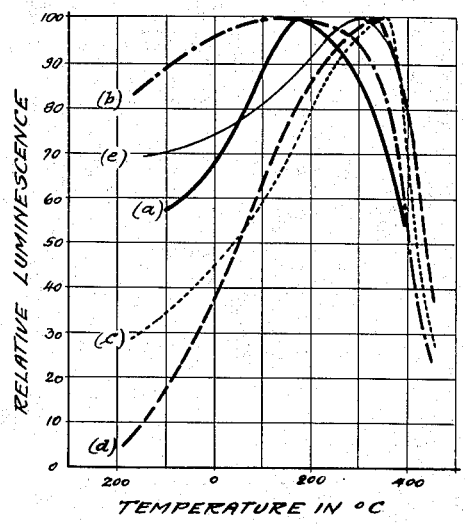
Figure 11 is a graph illustrating the variation in temperature dependence of the same phosphor under different conditions of measurement.

Temperature dependence of luminescence measurements, made since the filing of the parent application, have shown the need for more specificity in the conditions under which the measurements are made when reporting results. For example, it has been found that the curve obtained depends upon the wavelengths of excitation used, the wavelength at which emission is measured, and whether instantaneous values of fluorescence or average values of luminescence (fluorescence+phosphorescence) are measured. Fig. 11 illustrates the variation in temperature dependence of magnesium fluorogermanate produced by each of the above conditions. Curve (a) was obtained using an oscilloscope technique in which the variation in peak fluorescence with temperature was measured for 2537 A. U. excitation (60 C. P. S. half wave) and a spectral emission band-width which included the entire phosphor emission. Curve (b) is a plot of average values of luminescence vs. temperature for the same conditions. Average values were obtained by using a meter to measure photocurrent and full wave 60 C. P. S. operation of the exciting source. Curve (c) differs from (b) in that the longer wavelength ultraviolet of mercury was used for excitation (CH-4 lamp+Corning 9863 filter). Curves (d) and (e) were obtained under the same conditions as (c) except that the wavelengths at which emission was measured were 6325 and 6600 A. U. respectively. The conditions under which curve (c) was obtained, are closest to the actual conditions existing when the phosphor is used in the color correction of H. P. M. V. sources and it is, therefore, this type curve which is of greatest practical interest. From this curve it is seen that the phosphor functions most efficiently at temperatures in the vicinity of 350° C.; this is the temperature at which the outer bulb of present color-corrected lamps should be designed to operate. As to the theoretical aspect of the above temperature dependence phenomena, little can be said at this stage. However, a partial explanation of the effect of excitation wavelength (curves (b) and (c)) may be found in the shape of the excitation curves (see Fig. 8) plus the fact that the curve broadens at elevated temperatures so as to actually increase the absorption of longer wave (3650 A. U.) ultraviolet. Further measurements using the individual mercury lines for excitation are needed to confirm this supposition and to determine the magnitude of the effect. A shift or broadening in the emission spectrum with temperature may similarly account for such differences as between curves (d) and (e) of Fig. 11.

Another factor which may affect the temperature dependence of the germanate phosphor is that of composition. This has been varied in many ways by substitutions of both anion and cation and by additions, but the only element found thus far which materially affects the phosphor in this way is zinc when substituted for magnesium. A very slight but apparently definite dependence of the temperature curves upon manganese concentration seems to be evidenced by the curves of Fig. 12. However, room temperature brightness of the sample with .02 mole Mn per mol of phosphor is more than twice that of the lowest Mn sample so that there is actually no gain obtained in high temperature efficiency by using the lower percentages of Mn; maximum room temperature brightness determines Mn content.

The preferred optimum molar composition for the magnesium fluorogermanate phosphor is about as follows:

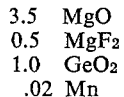

3.5    MgO
0.5    MgF$_2$
1.0    GeO$_2$
.02    Mn

This formula results in a less fritted product of slightly higher output than a previous composition which had twice the fluorine and half the manganese content. The optimum firing time appears to be the longest firing time; samples fired as long as 87 hours still show improvement upon further heating. A sample fired 23 hrs. at 1080° C. showed a 10% brightness increase upon refiring for 64 hrs.; two days' additional heating improved the sample about 5% in brightness.

Referring to the drawing in detail, and first considering the embodiment of my invention illustrated in Figure 1, there is shown a color-corrected high-pressure mercury vapor lamp 11, comprising a quartz inner envelope 12, the ends of which are supported by mica plates 13 and 14, through which pass supporting wires 15 and 16, welded to a lead 17 projecting from press 19, adjacent the base 21 of the translucent outer bulb 22.

A mica disc 23 supported in the neck portion 32 on the leads 17 and 18 serves to protect the press from the heat of operation. The lamp 11 has a main electrode 25 at its outer end connected to support wires 15 and 16 by lead 26, and a main electrode 27 at its inner end connected to lead 18 by flexible conductor 28. A starting electrode 29 is provided, connected through a resistor 31 to lead 17. The envelope 12 encloses a quantity of mercury and inert gas at a pressure above atmospheric, as is customary in lamps of this character.

The outer envelope, in the present embodiment, is one adapting the lamp for horizontal operation, and so is generally ellipsoidal with its long axis as that of the lamp 11, so that it will operate as near isothermally as possible. The end portion 33, however, opposite the base 21, as well as the neck portion 32, are formed generally cylindrical about the axis of the envelope 12 and of a relatively small diameter, so as to be engaged by spring fingers 24 on the supporting wires 15 and 16 for positioning said envelope 12 in the outer envelope 22. The space between the envelopes 12 and 22 is evacuated. The inner surface of the outer envelope 22 is coated with a selected color-correcting phosphor. For an approximate optimum operating temperature of the phosphor 34, assuming the preferred magnesium fluorogermanate, the length of the ellipsoidal portion of the bulb 22, when enclosing a 400 watt lamp, is about 8", and its maximum transverse dimension is about 6".

Referring now to the embodiment of my invention illustrated in Figure 2, there is shown a lamp 11$^a$, with an outer envelope 22$^a$. The construction and manner of supporting the inner structure involving the envelope 12$^a$, corresponds with that of the lamp 11 of the first embodiment. However, the envelope 22$^a$ of the present embodiment is such as to adapt the lamp for base-down operation. It is, therefore, generally pear-shaped in form, with its large end uppermost, as illustrated, so that the currents of air passing up along outside of said outer envelope serve to cool it in a manner which results in approximately isothermal operation. The size of the envelope is desirably such that the phosphor 34$^a$ positioned on the inner surface thereof is maintained at optimum temperature for the generation of fluorescent light, as in the preceding embodiment.

Figure 3 illustrates another embodiment which corresponds with that of Figure 2, except that the lamp is operated base down, and so the larger portion of the otherwise-similarly-formed pear-shaped part 22$^b$, which encloses the inner bulb 12$^b$, is adjacent the base 21$^b$, rather than adjacent the opposite end thereof.

Figure 4 illustrates an embodiment corresponding with Figure 1, except that the outer envelope 22$^c$ is generally cylindrical and smaller than that of either of the other embodiments. In other words, the present embodiment is a compromise to use a standard size outer envelope which carries on its interior surface the selected phosphor and has some of the advantages of the invention, by correcting the color of the light emitted from the inner bulb 12$^c$, while at the same time sacrificing some of the advantages by operating at a temperature higher than that optimum for light generation by a phosphor embodying my invention.

Figure 5 is a graph comparing the relative outputs at different temperatures of manganese-activated phosphors embodying my invention, such as the magnesium fluorogermanate, magnesium beryllium fluorogermanate, and magnesium beryllium germanate, with other manganese activated phosphors, such as unsubstituted magnesium germanate, zinc orthogermanate, and zinc beryllium silicate. The curves are correspondingly marked, without indicating the amount of the manganese, which has been disclosed.

From this, it will be seen that magnesium beryllium germanate has its optimum light-generation temperature at the operating temperature of about 220° C. (which is the highest of the optimum temperatures of the phosphors referred to), magnesium fluorogermanate coming next with an optimum light generating temperature at about 175° C., while magnesium germanate has an optimum light generating temperature at about 150° C. This figure also shows that zinc beryllium silicate is not nearly as good, as its light output falls off quickly with increasing temperatures from those several hundred degrees below 0° C. A consideration of the light generation of zinc orthogermanate, will show that its optimum temperature is slightly below 0° C. and falls off rapidly thereabove.

From the foregoing, it might be thought that manganese activated magnesium beryllium germanate was the best of all of the represented phosphors. However, this is only apparent from a consideration of the optimum operating temperatures. The temperature stability of the luminescence of a germanate phosphor is much improved by the substitution of some beryllia for magnesia, but best results have been obtained by the substitution of some fluorine for oxygen in the germanate phosphor. One having the formula, $2MgO \cdot 2MgF_2 \cdot GeO_2 : .01Mn$, has a room-temperature brightness approximately twice that of unmodified manganese-activated magnesium germanate, and the fluorine content may be varied continuously up to a ratio of about 1 to 1 of magnesium fluoride to magnesium oxide, with the activator concentration varying as in the magnesium germanate, i. e., .001 to .1.

This improvement may be visualized from a consideration of Figure 6, which shows that the curve for magnesium fluorogermanate, while having an optimum operating temperature lower than that for the beryllium-substituted magnesium germanate, has an intensity which starts so much higher, that at corresponding high temperature operation, the magnesium fluorogermanate is more efficient for light generation, than either the unsubstituted or beryllium-substituted germanate phosphor.

In summary, I would say that in order to prepare the substituted phosphors described herein, I may for a typical batch in the case of beryllium-containing samples weigh out 3.5 moles of MgO (141.1 grams), 0.5 mole of BeO (12.5 grams), one mole of $GeO_2$ (104.6 grams), and 0.01 mole of $MnCO_3$ (1.149 grams) and intimately mix these constituents, either wet or dry, using methods known well in the art. The raw materials should be of high purity (C. P. grade or better) and are not necessarily limited to the oxides; for example the carbonate, nitrate or sulphate of magnesium may be used, or other compound decomposing to give the oxide at the firing temperatures employed. Manganese may likewise be added in the form of the nitrate or other decomposable compound, but the oxides of Be and Ge are favored because these are the most readily available forms of these elements.

In general, where soluble compounds of the raw materials are used, a wet mixing procedure is preferred, in which case the thoroughly mixed slurry is carefully evaporated to dryness, and the residue broken up finely before firing. The raw batch, thus obtained by either the wet or dry mixing process, is then placed in a platinum tray and fired at a temperature between 1000° C. and 1250° C. for a time between 30 minutes and 12 hours or even longer. The most practical time is considered to be 2 to 3 hours at about 1100° C. The fired material is then broken up either by hammer milling or ballmilling and is then ready for use. If desired, the material may be refired to improve the output, after which it is again broken up to a fine powder.

The preparation of the fluorine-substituted samples is similar to the above. For example, I may take, for a typical batch, 3 moles of MgO (120.96 grams), 1 mole of $MgF_2$ (62.32 grams), one mole of $GeO_2$ (104.60 grams), and 0.01 mole of $MnCO_3$ (1.149 grams) and intimately mix these constituents either wet or dry. Purity of the raw materials should be high, as above, and it has been found most desirable to use the oxides or carbonates of the elements for the fluorine-substituted samples. The finely divided and intimately mixed raw batch is fired in a platinum tray at a temperature between 1000° C. and 1250° C. for a time between 30 minutes and 12 hours or even longer. Generally, 2 to 3 hours firing at about 1100° C. show the most practical results. The fired material is then ballmilled just long enough to break up the phosphor particles; usually less than 1 hour. If desired, refiring of the sample at a somewhat lower temperature (1080° C.) for 1 hour or so, without subsequent ballmilling may be employed to further improve the phosphor brightness.

Although preferred embodiments of my invention have been disclosed, it will be understood that modifications may be made within the spirit and scope of the appended claims. For example, in all of the proposed phosphors the ratio of the cation to the anion, i. e., the more positive elements such as magnesium or beryllium, or both to the germanium, may vary from 6 to the ortho relationship of 2.

I claim:

1. A phosphor for use in improving the quality of light generated by a source of visible and ultraviolet radiations, having the gram molecular formula, $$x\text{MgO} \cdot y\text{MgF}_2 \cdot \text{GeO}_2 : z\text{Mn}$$

in which $x$ is a number lying in the range between and including 2 and 6, $y$ is a number lying in the range between and including 2 and .1, and $z$ is a number lying in the range between and including .001 and .1.

2. A phosphor having a high output in the red spectral region when acted on by ultra-violet radiations, having the gram molecular formula, $3.5\text{MgO} \cdot y\text{MgF}_2 \cdot \text{GeO}_2 : z\text{Mn}$, in which $y$ is a number lying in the range between and including 2 and .1, and $z$ is a number lying in the range between and including .001 and .1.

3. A phosphor with the approximate gram molecular formula $2\text{MgO} \cdot 2\text{MgF}_2 \cdot \text{GeO}_2 : .01\text{Mn}$, and having a high output in the red spectral region when acted on by ultra-violet radiations.

4. A phosphor with the approximate gram molecular formula $3\text{MgO} \cdot \text{MgF}_2 \cdot \text{GeO}_2 : .01\text{ Mn}$, and having a high output in the red spectral region when acted on by ultra-violet radiations.

5. A phosphor with the approximate gram molecular formula $3\text{MgO} \cdot \text{MgF}_2 \cdot \text{GeO}_2 : .01\text{Mn}$, and having a high output in the red spectral region when acted on by ultra-violet radiations.

6. In combination, a power-operable source of ultraviolet radiation, a light-transmitting envelope surrounding said source, and a coating on the surface of said envelope comprising a phosphor for which production of light in the red region of the spectrum by said radiation has a maximum at a temperature of about 350° C., and means causing the phosphor-bearing portion of said envelope to operate near said temperature.

7. In combination, a high-pressure mercury-vapor lamp, a light-transmitting envelope therefor, structural members positioning said lamp in said envelope, said structural members and the end portions of said lamp being coated with a light-reflecting medium, and a coating on the inner surface of said envelope of a manganese-activated magnesium fluorogermanate phosphor.

8. In combination with a source of ultraviolet radiation, a light-transmitting envelope for said source, and a phosphor coating on the inner surface of said envelope principally comprising manganese-activated magnesium fluorogermanate having the gram molecular formula $x\text{MgO} \cdot y\text{MgF}_2 \cdot \text{GeO}_2 : z\text{Mn}$, in which $x$ is a number lying in the range between and including 2 and 6, $y$ is a number lying in the range between and including 2 and .1, and $z$ is a number lying in the range between and including .001 and .1.

9. In combination, a power-operable high-pressure mercury vapor source normally emitting ultraviolet radiation and light deficient in red radiation when operated, a light-transmitting envelope surrounding said source, a phosphor coating on the inner surface of said envelope for which production of light in the red region of the spectrum when energized by ultraviolet radiation is at a maximum within the range of 150° C. to 400° C., said phosphor being selected from the group consisting of manganese-activated magnesium germanate having a magnesium to germanium ratio of approximately 4 to 1 and manganese-activated magnesium fluorogermanate having the gram molecular formula $x\text{MgO} \cdot y\text{MgF}_2 \cdot \text{GeO}_2 : z\text{Mn}$, in which $x$ is a number lying in the range between and including 2 and 6, $y$ is a number lying in the range between and including 2 and .1, and $z$ is a number lying in the range between and including .001 and .1, the power input to said source in relation to the size of said envelope causing the phosphor-bearing portion of said envelope to operate within said temperature range.

10. In combination, a power-operable high-pressure mercury vapor source normally emitting ultraviolet radiation and light deficient in red radiation when operated, a light-transmitting envelope surrounding said source, a phosphor coating on the inner surface of said envelope for which production of light in the red region of the spectrum when energized by ultraviolet radiation is at a maximum within the range of 150° C. to 400° C., said phosphor being manganese-activated magnesium fluorogermanate having the gram molecular formula $$x\text{MgO} \cdot y\text{MgF}_2 \cdot \text{GeO}_2 : z\text{Mn}$$

in which $x$ is a number lying in the range between and including 2 and 6, $y$ is a number lying in the range between and including 2 and .1, and $z$ is a number lying in the range between and including .001 and .1, the power input to said source in relation to the size of said envelope causing the phosphor-bearing portion of said envelope to operate within said temperature range.

11. The combination which comprises a power-operable high-pressure mercury-vapor discharge source having the characteristic of emitting both ultraviolet radiation and visible radiation normally deficient in red radiation; an envelope surrounding said source and light-transmitting to said visible radiation; and a translucent light-emitting coating on said envelope, constituting a secondary source of visible radiation when subjected to excitation by ultraviolet radiation, and comprising a phosphor for which emission of light in the red region of the visible spectrum under excitation by a substantial range of ultraviolet wavelengths has a maximum within a range of temperatures of from 150° C. to 400° C., the total red lumens produced by said source and by said phosphor, as measured when said phosphor has been operated within said temperature range for approximately 100 hours, being at least 5.5% of the total lumens produced by said source and said phosphor, and the ratio of the power input to said source in relation to the size of said envelope being selected to cause the phosphor-bearing portion of said envelope to operate within said temperature range, whereby the visible radiation emitted by said source is substantially color-corrected.

References Cited in the file of this patent

UNITED STATES PATENTS

| Number | Name | Date |
| --- | --- | --- |
| 2,118,091 | Leverenz | May 24, 1938 |
| 2,152,989 | Ewest | Apr. 4, 1939 |
| 2,182,087 | Leverenz | Dec. 5, 1939 |
| 2,285,464 | Ruthruff | June 9, 1942 |
| 2,306,270 | Leverenz | Dec. 22, 1942 |
| 2,447,448 | Williams | Aug. 17, 1948 |
| 2,447,449 | Williams | Aug. 17, 1948 |

FOREIGN PATENTS

| Number | Country | Date |
| --- | --- | --- |
| 544,444 | Great Britain | Apr. 14, 1942 |

OTHER REFERENCES

De Ment: Fluorochemistry, 1945, pp. 378, 379.